J. H. VENNERS.
TRACTION ENGINE.
APPLICATION FILED AUG. 31, 1910.
1,010,988.
Patented Dec. 5, 1911.
2 SHEETS—SHEET 1.
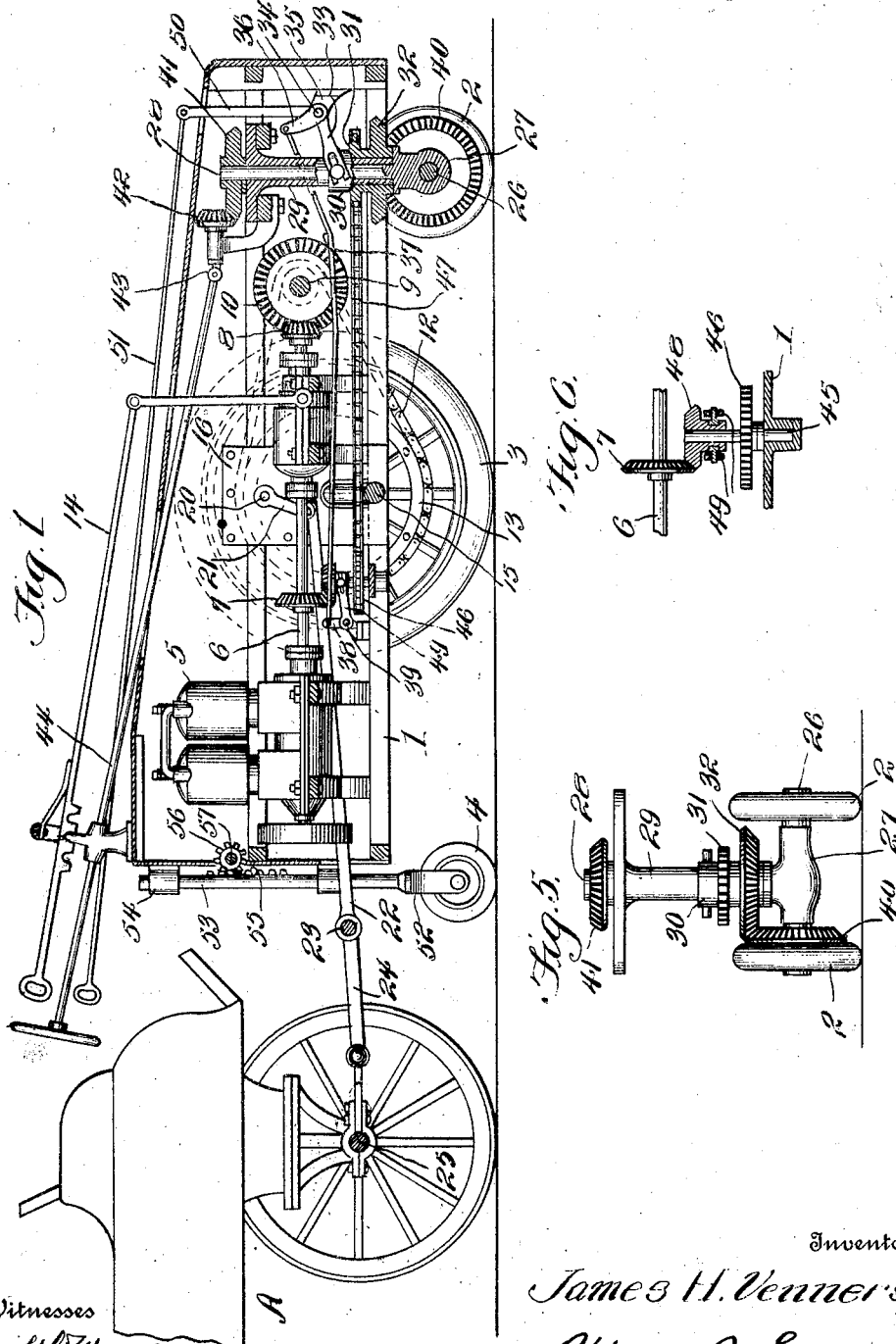
Witnesses
J. L. Wright
V. B. Hillyard
Inventor
James H. Venners
By Victor J. Evans,
Attorney

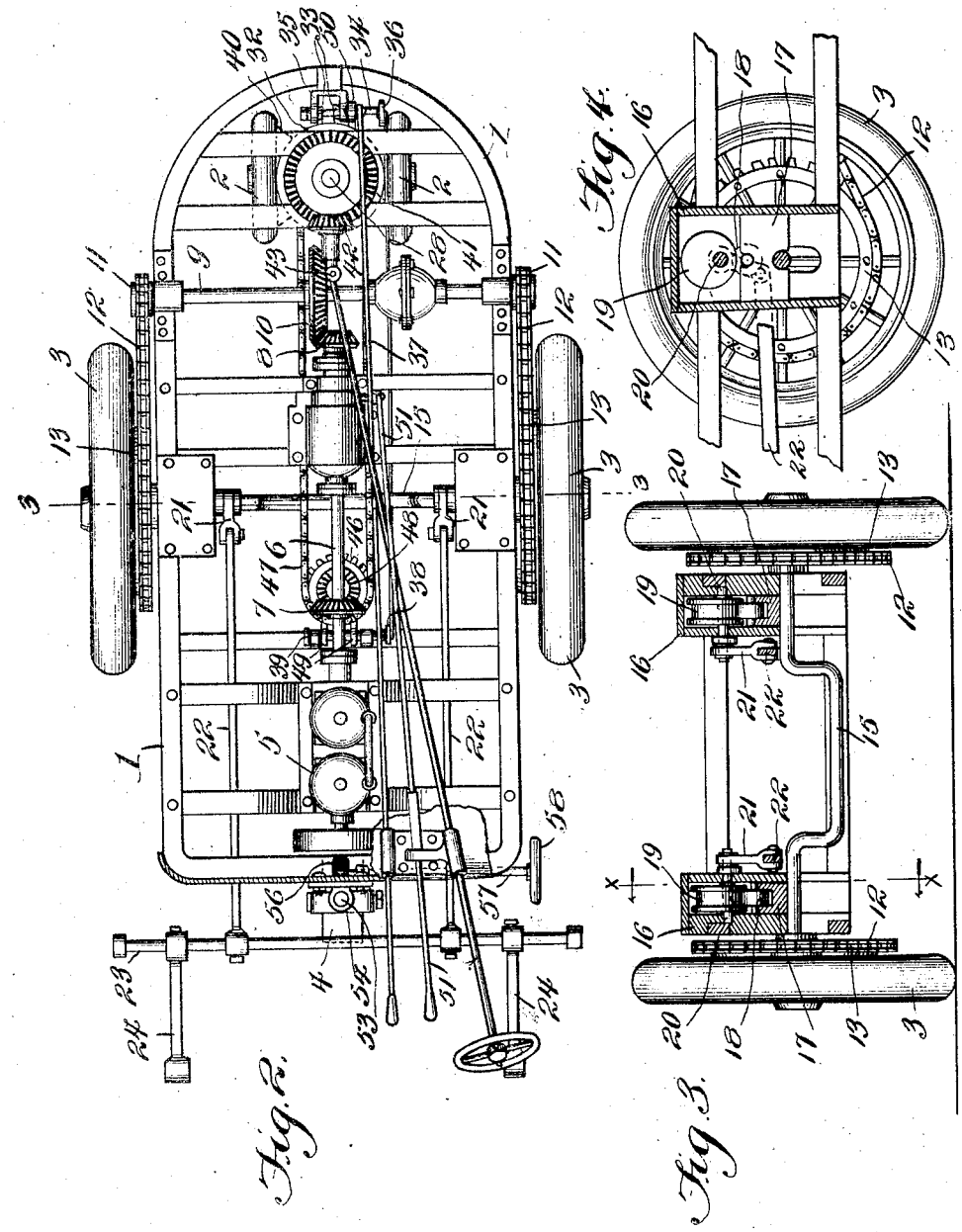

UNITED STATES PATENT OFFICE.

JAMES H. VENNERS, OF BROOKLYN, NEW YORK, ASSIGNOR OF ONE-HALF TO WILLIAM L. MILLSPAUGH, OF BROOKLYN, NEW YORK.

TRACTION-ENGINE.

1,010,988.   Specification of Letters Patent.   Patented Dec. 5, 1911.

Application filed August 31, 1910. Serial No. 579,827.

*To all whom it may concern:*

Be it known that I, JAMES H. VENNERS, a citizen of the United States, residing at Brooklyn, in the county of Kings and State of New York, have invented new and useful Improvements in Traction-Engines, of which the following is a specification.

The purpose of the invention is the provision of a mechanism for replacing the horse in hauling drays, wagons and kindred vehicles intended for transporting loads from one place to another in cities, villages or like places where a load is moved by means of a wheeled vehicle.

The invention contemplates a traction engine which may be coupled to a wagon or dray for hauling the same from place to place, said engine embodying a tractor which is movable and held at all times in engagement with the surface of the road by a force proportionate to the pull, thereby insuring propulsion of the machine and the vehicle to be drawn thereby.

A further purpose of the invention is to combine with the engine steering wheels which under certain conditions may be used as a tractor to supplement the action of the main tractor or to enable the engine to make a short turn, which is of advantage in cities or places having comparatively narrow streets or roads, so that when the wagon to be unloaded is backed against the curb or to one side of the street or roadway the engine may be turned to occupy a position approximately parallel with the street or roadway so as not to obstruct traffic.

The invention further contemplates novel means for transmitting power to the tractor and steering wheels and admitting of positive and ready control so that the machine may be advanced, reversed or caused to make a short turn according to conditions and requirements.

The invention consists of the novel features, details of construction and combination of parts, which hereinafter will be more particularly set forth, illustrated in the accompanying drawings, and pointed out in the appended claims.

Referring to the drawings, forming a part of the application, Figure 1 is a vertical longitudinal section of a traction engine embodying the invention, showing the manner of coupling the same to a wagon. Fig. 2 is a top plan view of the machine. Fig. 3 is a transverse section on the line 3—3 of Fig. 2, the drive wheels being shown in full. Fig. 4 is a detail section on the line x—x of Fig. 3, looking to the left as indicated by the arrows. Fig. 5 is a detail view of the steering wheels. Fig. 6 is a detail view of a part of the mechanism for transmitting motion to the steering wheels when the latter are used as a tractor.

Corresponding and like parts are referred to in the following description, and indicated in all the views of the drawings, by the same reference characters.

The traction engine or machine comprises a main frame 1, which may be of any construction, the same being mounted upon wheels 2, 3 and 4. An engine 5 of any type is mounted upon the framework and is the source from which power is derived for propelling the machine. The drive shaft 6 is rotated by means of the engine 5 and has bevel gears 7 and 8 secured thereto. A transverse shaft 9 is provided with a bevel gear 10, which is in mesh with the bevel gear 8. Sprocket wheels 11 are secured to the outer ends of the shaft 9 and are connected by drive chains 12 with sprocket gears 13 secured to the drive wheels 3. The shaft 9 is provided with the ordinary differential to compensate for variation in the rotation of the drive wheels 3. The transmission may include the usual speed mechanism to admit of the machine moving forward, being reversed, or brought to a standstill without stopping the engine. The speed control is operated by means of a lever 14, which extends within convenient reach of the operator mounted upon the seat of the wagon A to which the machine is coupled.

The tractor comprises the drive wheels 3, which are mounted to have a limited vertical movement. The axle 15 has a central drop portion and its end portions pass through vertical slots formed in housings 16 firmly attached to the framework of the machine. Blocks 17 are mounted in the housings 16 to move freely therein and constitute bearings for the axle 15. Each of the bearing blocks 17 has a roller 18 at its upper end, which is engaged by a cam 19, the latter being fast to a shaft 20 mounted in the housing 16. The inner ends of the shafts 20 have arms 21 secured thereto and the free ends of these arms are connected by rods 110 or bars 22 to a transverse shaft 23, which is adapted to be coupled to the vehicle to be drawn by means of the machine. Arms 24 have adjustable connection with the shaft 23 and are adapted to be coupled to the front axle 25 of the wagon A. By having the arms 24 adjustably connected with the shaft 23 the distance between them may be regulated to suit the couplings or other draft attachments provided upon the front axle of the vehicle to which the traction engine is to be connected. A pull upon the rods or bars 22 is transmitted to the arms 21 and thence to the cams 19, which latter operating upon the rollers 18 of the bearing blocks 17 press the latter downward and force the drive wheels 3 into engagement with the surface of the road or street with a pressure proportionate to the load, thereby insuring sufficient tractive force to propel the machine and the loaded wagon or vehicle coupled thereto. This arrangement of parts also insures positive engagement between the tractor wheels 3 and the surface, so that the driving force is exerted at all times when the machine is in operation, whether traveling over a smooth surface or a rough surface.

The steering wheels 2 are mounted upon an axle 26, which is mounted in a transverse sleeve 27 at the lower end of a vertical shaft 28. A vertical sleeve 29 secured rigidly to the framework forms a bearing for the shaft 28 and supports a sleeve 30, which is mounted thereon to move vertically and to rotate. The sleeve 30 has a sprocket wheel 31 and a bevel gear 32 and is controlled in its vertical movements by means of a forked arm 33 secured to a shaft 34, which is mounted in a bracket 35 secured to a part of the framework. The shaft 34 has a second arm 36, which is connected by means of a rod 37 to an arm 38 secured to a transverse shaft 39. Movement of the shaft 34 brings about a vertical movement of the sleeve 30, with the result that the bevel gear 32 is thrown into or out of engagement with a bevel gear 40 secured to one of the steering wheels 2. When the sleeve 30 is elevated and the bevel gear 32 is disengaged from the bevel gear 40 the steering wheels 2 are free to rotate, but when the bevel gears 32 and 40 are in engagement and the sleeve 30 is positively rotated the steering wheel 2 provided with the bevel gear 40 becomes a driver and supplements the action of the main tractor in propelling the machine or may be employed solely for making a short turn. In the latter case the drive power is disconnected from the main tractor or drive wheels 3 so that when the steering wheels are turned to an angle relatively to the length of the machine the latter may be moved laterally at its front end, thereby enabling the machine as a whole to be turned aside so as not to obstruct traffic when the wagon A is backed to the curb or side of the street or roadway to be unloaded or to receive a load. A bevel gear 41 is secured to the upper end of the shaft 28 and is in mesh with a bevel gear 42 fastened to a shaft 43, which is coupled to a steering shaft 44 extending within convenient reach of the operator mounted upon the seat of the wagon A.

A vertical shaft 45 is mounted upon a convenient portion of the framework and has a sprocket gear 46 secured thereto. A sprocket chain 47 passes around the sprocket gears 46 and 31 and transmits motion from the shaft 45 to the sleeve 30. A bevel gear 48 is mounted upon the vertical shaft 45 to move thereon and to turn therewith, said bevel gear being adjustable upon the shaft 45 by means of an arm 49, which is secured to the transverse shaft 39. When the bevel gear 48 is moved vertically upon the shaft 45 into engagement with the bevel gear 7 motion is transmitted from the drive shaft 6 to the shaft 45 and from the latter to the sleeve 30, thereby imparting movement to the steering tractor, whereby the machine may be caused to make a short turn or the action of the main tractor supplemented. It is to be understood that any means may be employed for moving the bevel gears 48 and 32, but the instrumentalities herein disclosed are preferred, since they admit of both bevel gears being operated simultaneously, whereby the bevel gears 48 and 7 and 32 and 40 are synchronously engaged or disengaged. An arm 50 is secured to the shaft 34 and a rod or bar 51 is connected to the upper end thereof and extends within convenient reach of the operator's seat to admit of the steering tractor being thrown into or out of operation as may be required.

The invention provides a machine which may be advantageously used in cities, villages and other thickly populated districts for drawing wagons or other loaded vehicles, thereby supplanting the horse and at the same time providing a machine which may be positively controlled and which is enabled to make a short turn so as not to obstruct traffic or to steer clear of an obstruction or other vehicle. In order that the steering wheels may be easily turned it is proposed to lift the same from the ground when it is required to turn the same. This result is effected by mounting the rear wheel 4 so that it may be adjusted vertically and after the wheel 4 has been elevated the rear part of the machine may be depressed and the front part correspondingly elevated, thereby lifting the steering wheels from the ground and when so elevated they may be turned with ease by operating the steering shaft 44. The wheel 4 is mounted in a frame 52 which is connected to the lower end of a vertical stem 53, the latter being mounted in guides 54 and provided with cog teeth 55, which are in mesh with a pinion 56 secured to a transverse shaft 57 mounted in suitable bearings upon the framework, said shaft being provided at one end with a hand wheel 58 for convenience of operation. The machine is practically balanced upon the axle 15, so that when the rear wheel 4 is lifted a slight pressure upon the rear portion of the machine depresses said end and correspondingly elevates the front end, thereby lifting the steering wheels 2 in the manner stated.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claims appended hereto.

Having thus described the invention what is claimed as new, is:—

1. A traction engine provided with a vertically movable tractor, draft appliances for connecting the engine to the load to be moved, and pressure exerting means embodying a variable leverage having connection with the draft appliances and automatically actuated thereby for pressing the tractor into engagement with the surface of the road proportionately to the weight of the load.

2. In a traction engine a tractor mounted to move vertically, pressure exerting means for moving the tractor downward and holding the same in engagement with the surface over which the machine is traveling, said pressure exerting means embodying a variable leverage and draft appliances for connecting the load to the machine and having connection with said pressure exerting means to automatically operate the same to hold the tractor by a variable force in engagement with the surface over which the machine is traveling under all conditions.

3. In a traction engine, the combination of a tractor mounted to move vertically, a cam adapted to exert a vertical pressure upon the tractor to hold the same positively in engagement with the surface over which the machine is traveling, an arm having connection with the cam, and draft appliances connected with said arm and adapted to connect the load to the machine.

4. In a traction engine, the combination of a tractor, a bearing for the tractor mounted to move vertically, a cam adapted to exert a vertical pressure upon the bearing, an arm having connection with said cam, and draft appliances connected with said arm and adapted to couple the machine with the load to be drawn.

5. In a traction machine, the combination of two drive wheels, vertically movable bearings therefor, cams mounted to exert a vertical pressure upon said bearings, arms having connection with said cams, and draft appliances connected with said arms to move the same and operate the cams to depress the drive wheels.

In testimony whereof I affix my signature in presence of two witnesses.

JAMES H. VENNERS.

Witnesses:
Wm. L. Millspaugh,
F. V. Court.